United States Patent
Park et al.

(10) Patent No.: US 10,551,922 B2
(45) Date of Patent: Feb. 4, 2020

(54) ELECTRONIC DEVICE AND METHOD FOR PROVIDING HAPTIC FEEDBACK THEREOF

(71) Applicant: Samsung Electronics Co., Ltd., Suwon-si, Gyeonggi-do (KR)

(72) Inventors: Seongwoong Park, Seoul (KR); Byungjin Kang, Seoul (KR); Gusul Kim, Seoul (KR); Namhoi Kim, Suwon-si (KR); Myunghyun Lee, Suwon-si (KR); Yusun Cheong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 15/190,603

(22) Filed: Jun. 23, 2016

(65) Prior Publication Data
US 2016/0378190 A1 Dec. 29, 2016

(30) Foreign Application Priority Data
Jun. 26, 2015 (KR) .......................... 10-2015-0090832

(51) Int. Cl.
*G06F 3/01* (2006.01)
*G06F 3/0346* (2013.01)
*G06F 3/041* (2006.01)

(52) U.S. Cl.
CPC ............ *G06F 3/016* (2013.01); *G06F 3/0346* (2013.01); *G06F 3/0414* (2013.01); *G06F 3/0416* (2013.01)

(58) Field of Classification Search
None
See application file for complete search history.

(56) References Cited

U.S. PATENT DOCUMENTS

| 6,976,215 B1* | 12/2005 | Roderick ................ G06F 3/016 345/184 |
| 2007/0242040 A1 | 10/2007 | Ullrich et al. |
| 2013/0222303 A1* | 8/2013 | Colgate .................. G06F 3/016 345/173 |

(Continued)

FOREIGN PATENT DOCUMENTS

| EP | 2 779 675 A2 | 9/2014 |
| EP | 2837993 A2 | 2/2015 |
| EP | 2 851 763 A1 | 3/2015 |

OTHER PUBLICATIONS

European Office Action dated Nov. 21, 2018, issued in European Application No. 16176306.5.

(Continued)

*Primary Examiner* — Brian M Butcher
(74) *Attorney, Agent, or Firm* — Jefferson IP Law, LLP

(57) ABSTRACT

An electronic device for offering an optimized and differentiated haptic feedback to a user on the basis of various states of an electronic device is provided. The electronic device includes a haptic module configured to provide a haptic feedback, a processor electrically connected to the haptic module, and a memory electrically connected to the processor. The memory stores instructions, that when executed by the processor, cause the processor to control to detect a signal of a request for the haptic feedback, to identify a contact part of the electronic device by using a sensor module, and to provide the haptic feedback based on results of identifying the contact part.

18 Claims, 11 Drawing Sheets

(56) References Cited

U.S. PATENT DOCUMENTS

| | | |
|---|---|---|
| 2014/0267904 A1 | 9/2014 | Saboune et al. |
| 2014/0347323 A1 | 11/2014 | Colgate et al. |
| 2015/0042573 A1 | 2/2015 | Grant et al. |
| 2015/0077324 A1 | 3/2015 | Birnbaum et al. |
| 2015/0160771 A1 | 6/2015 | Takeuchi |
| 2015/0324049 A1* | 11/2015 | Kies .................... G06F 3/0414 345/156 |

OTHER PUBLICATIONS

European Examination Report dated Aug. 23, 2019, issued in European Application No. 16 176 306.5-1216.

* cited by examiner

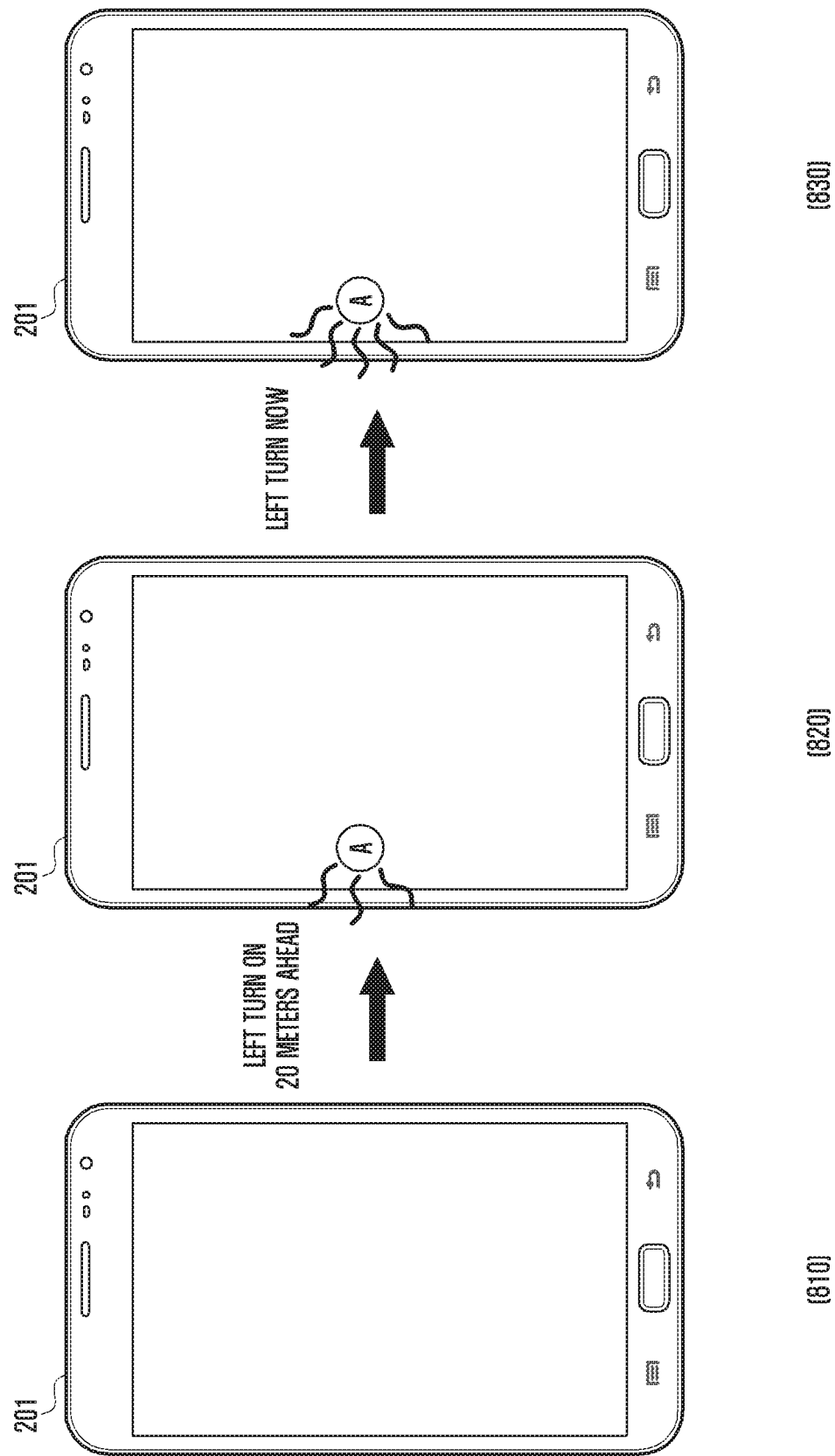

ELECTRONIC DEVICE AND METHOD FOR PROVIDING HAPTIC FEEDBACK THEREOF

CROSS-REFERENCE TO RELATED APPLICATION(S)

This application claims the benefit under 35 U.S.C. § 119(a) of a Korean patent application filed on Jun. 26, 2015 in the Korean Intellectual Property Office and assigned Serial number 10-2015-0090832, the entire disclosure of which is hereby incorporated by reference.

TECHNICAL FIELD

The present disclosure relates to an electronic device and method for providing various haptic feedbacks.

BACKGROUND

With the advance of computer-based systems, an interface between a human being and a machine becomes more important. A human-machine interface should be intuitive to anyone and be used easily. A touch screen or touch pad is an example of an intuitive and easy interface. A touch screen may be formed of a panel capable of tactile sensing and a display device. Normally a touch screen allows a user to manipulate the position and function of a pointer by a direct contact on the screen.

Meanwhile, in order to provide a haptic feedback to a touch screen, an apparatus for producing the haptic feedback has been developed actively. Here, the term haptic refers to a tactile sensation felt by a human finger, hand, or the like when a human being touches a certain object. The term haptic is the concept of including a tactile feedback perceived by a skin touched on the surface of an object and a kinesthetic force feedback felt when the motion of a joint and a muscle is disturbed. Particularly, vibration effects or vibrating tactile haptic effects may be useful for notifying specific events to a user or for offering a realistic feedback for producing greater sensory immersion in simulated or virtual environments.

Recent electronic devices having a touch screen or touch pad may provide a haptic feedback for delivering good sensory immersion together with a sense of button click and visual information. In order to produce a haptic feedback of a mobile device, a certain haptic actuator such as a vibration motor, linear resonant actuator (LRA), a piezo actuator, or the like may be used.

The above information is presented as background information only to assist with an understanding of the present disclosure. No determination has been made, and no assertion is made, as to whether any of the above might be applicable as prior art with regard to the present disclosure.

SUMMARY

In case of providing a haptic feedback to a user regardless of a state of holding an electronic device or regardless of surrounding circumstances, a user may fail to feel sufficient sensory immersion in an application executed or content played at an electronic device.

Aspects of the present disclosure are to address at least the above-mentioned problems and/or disadvantages and to provide at least the advantages described below. Accordingly, an aspect of the present disclosure is to provide an apparatus and method for offering an optimized and differentiated haptic feedback to a user on the basis of various states of an electronic device.

In accordance with an aspect of the present disclosure, an electronic device is provided. The electronic device includes a haptic module configured to provide a haptic feedback, a processor electrically connected to the haptic module, and a memory electrically connected to the processor. The memory may store instructions, that when executed by the processor, cause the processor to control to detect a signal of a request for the haptic feedback, to identify a contact part of the electronic device by using a sensor module, and to provide the haptic feedback based on results of identifying the contact part.

In accordance with another aspect of the present disclosure, a method for providing an optimized haptic feedback to a user based on a contact area or any other state information is provided. This may maximize a haptic experience and also minimize power consumption in an electronic device. Additionally, it is possible to provide different haptic feedbacks to a user, based on content being played in an electronic device. This may maximize immersion in content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram illustrating an operation of providing a haptic feedback on the basis of position information of an electronic device so as to perform a navigation function according to various embodiments of the present disclosure;

Throughout the drawings, it should be noted that like reference numbers are used to depict the same or similar elements, features, and structures.

DETAILED DESCRIPTION

Figure 1:
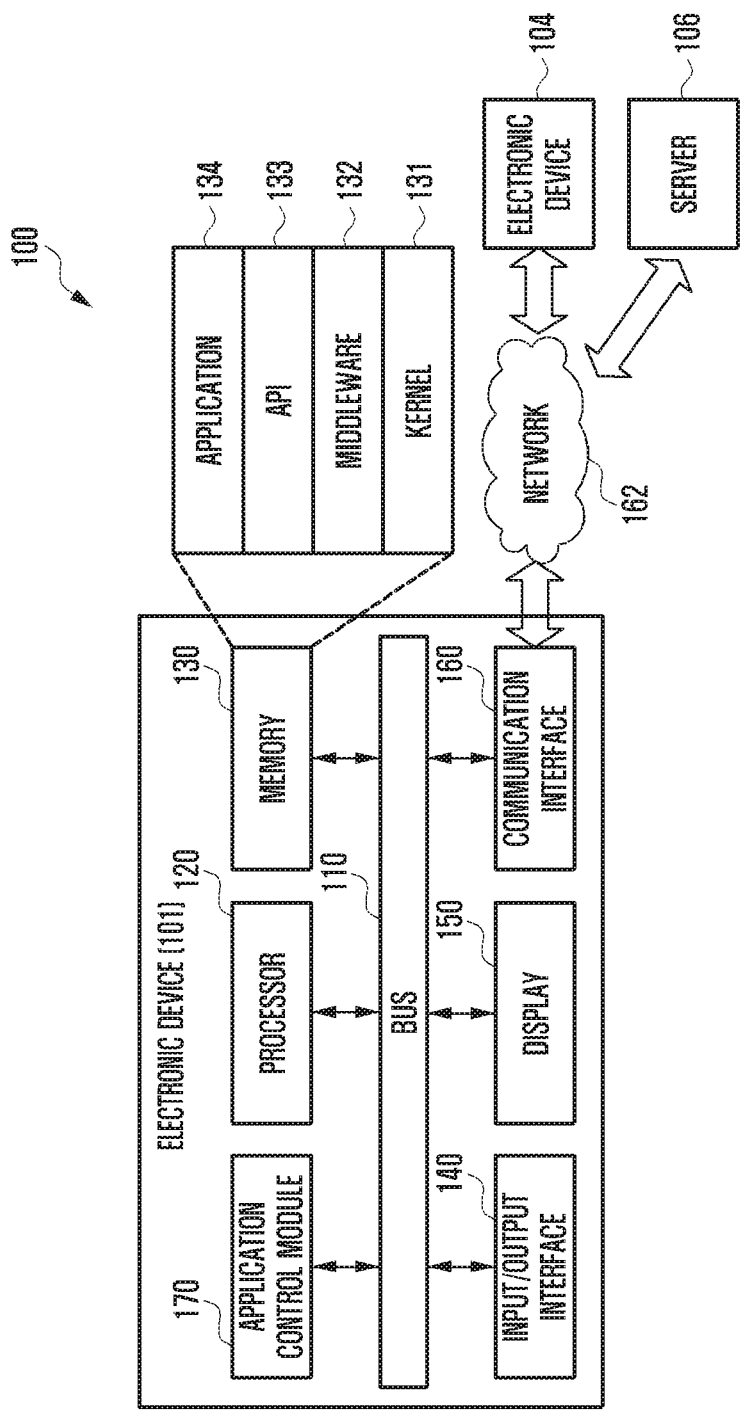
FIG. 1 is a diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

"Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, operations, elements, and/or components, but do not preclude the presence or addition of one or more other features, regions, integers, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

In the present disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to various embodiments of the present disclosure, an electronic device may be a smart home appliance that involves a communication function. For example, an electronic device may be a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung meSync™, Apple TV™, Google TV™, etc.), a game console, an electronic dictionary, an electronic key, a camcorder, or an electronic picture frame.

According to various embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot.

According to various embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are not to be considered as a limitation of the present disclosure.

FIG. 1 is a block diagram illustrating a network environment 100 including therein an electronic device 101 in accordance with an embodiment of the present disclosure.

Referring to FIG. 1, the electronic device 101 may include, but not limited to, a bus 110, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The processor 120 may receive commands from the other elements (e.g., the memory 130, the input/output interface 140, the display 150, the communication interface 160, or the application control module 170, etc.) through the bus 110, interpret the received commands, and perform the arithmetic or data processing based on the interpreted commands.

The memory 130 may store therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to various embodiments of the present disclosure, the application 134 may include a short message service (SMS)/multimedia message service (MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to various embodiments of the present disclosure, the application 134 may include a specific application specified depending on attributes (e.g., a type) of an external electronic device (e.g., the electronic device 104). For example, in case an external electronic device is an MP3player, the application 134 may include a specific application associated with a play of music. Similarly, in case an external electronic device is a portable medical device, the application 134 may include a specific application associated with a health care. In an embodiment of the present disclosure, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may perform a communication between the electronic device 101 and any external electronic device (e.g., the electronic device 104 or the server 106). For example, the communication interface 160 may communicate with any external device by being connected with a network 162 through a wired or wireless communication. A wireless communication may include, but not limited to, at least one of WiFi, Bluetooth (BT), near field communication (NFC), GPS, or a cellular communication (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.). A wired communication may include, but not limited to, at least one of universal serial bus (USB), high definition multimedia interface (HDMI), recommended standard 232 (RS-232), or plain old telephone service (POTS).

According to an embodiment of the present disclosure, the network 162 may be a communication network, which may include at least one of a computer network, an internet, an internet of things, or a telephone network. According to an embodiment of the present disclosure, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The application control module 170 may process at least part of information obtained from the other elements (e.g., the processor 120, the memory 130, the input/output interface 140, or the communication interface 160, etc.) and then offer it to a user in various ways. For example, the application control module 170 may recognize information about access components equipped in the electronic device 101, store such information in the memory 130, and execute the application 134 on the basis of such information. A further description about the application control module 170 will be given hereinafter through FIGS. 2, 3A, 3B, 4, 5A, 5B, 6A, 6B, 7, and 8.

Figure 2:
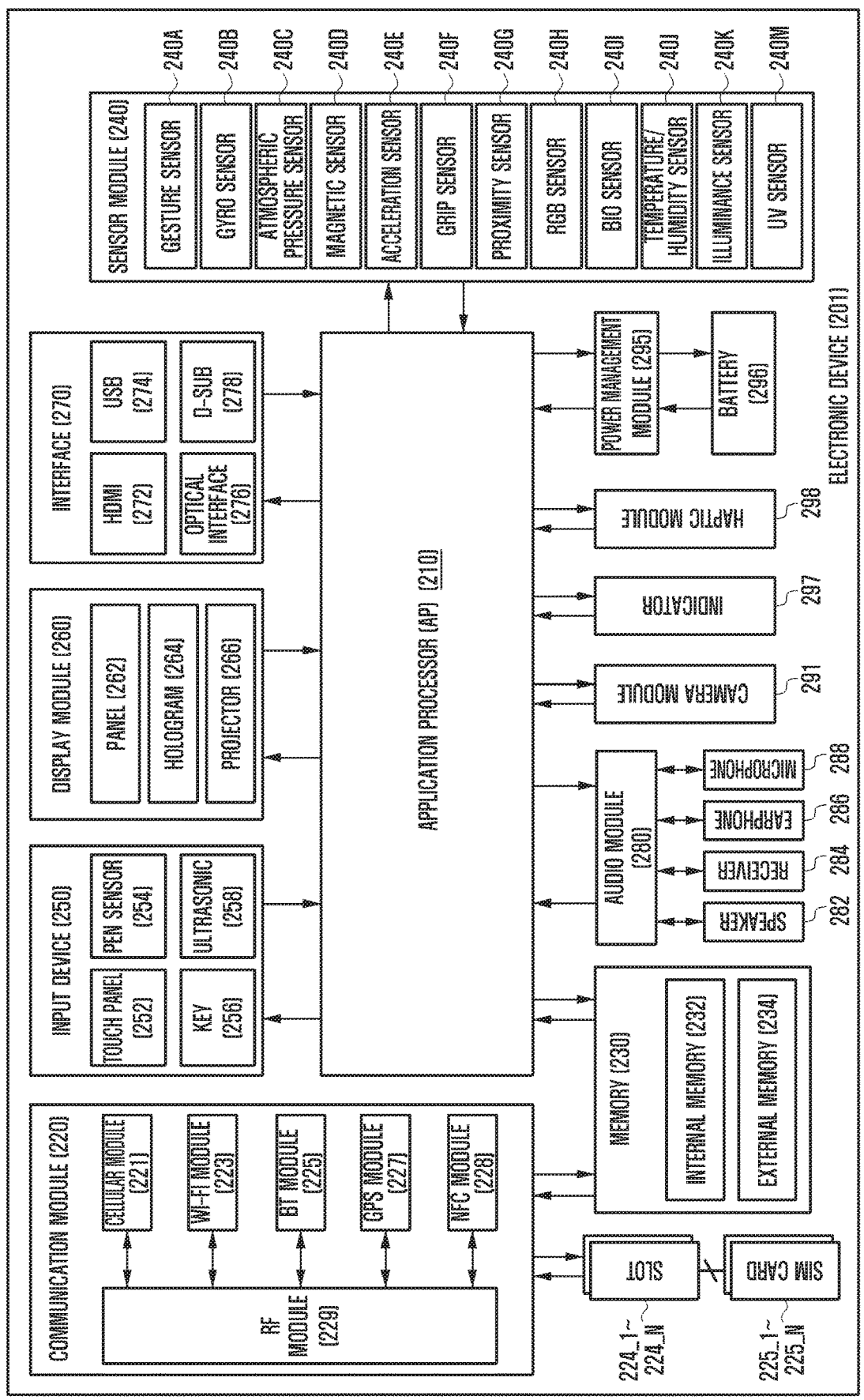
FIG. 2 is a block diagram illustrating an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a haptic module 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment of the present disclosure, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 101) through the network. According to an embodiment of the present disclosure, the communication module 220 may include therein a cellular module 221, a Wi-Fi module 223, a BT module 225, a GPS module 227, an NFC module 228, and a radio frequency (RF) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment of the present disclosure, the cellular module 221 may perform at least part of functions the AP 210 can provide. For example, the cellular module 221 may perform at least part of a multimedia control function.

According to an embodiment of the present disclosure, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment of the present disclosure, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the Wi-Fi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single integrated circuit (IC) chip or a single IC package in an embodiment. For example, at least part (e.g., the CP corresponding to the cellular module 221 and a Wi-Fi processor corresponding to the Wi-Fi module 223) of respective processors corresponding to the cellular module 221, the Wi-Fi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the Wi-Fi module 223, the BT module 225, the GPS module 227 and the NFC module 228 share the RF module 229, at least one of them may perform transmission and reception of RF signals through a separate RF module in an embodiment.

The SIM card 225_1 to 225 N may be a specific card formed of SIM and may be inserted into a slot 224_1 to 224 N formed at a certain place of the electronic device. The SIM card 225_1 to 225_N may contain therein an integrated circuit card identifier (ICCID) or an international mobile subscriber identity (IMSI).

The memory 230 (e.g., the memory 130) may include an internal memory 232 and an external memory 234. The internal memory 232 may include, for example, at least one of a volatile memory (e.g., dynamic random access memory (DRAM), static RAM (SRAM), synchronous DRAM (SDRAM), etc.) or a nonvolatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment of the present disclosure, the internal memory 232 may have the form of a solid state drive (SSD). The external memory 234 may include a flash drive, e.g., compact flash (CF), secure digital (SD), micro-SD, mini-SD, eXtreme digital (xD), memory stick, or the like. The external memory 234 may be functionally connected to the electronic device 200 through various interfaces. According to an embodiment of the present disclosure, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and an ultraviolet (UV) sensor 240M. Additionally or alternatively, the sensor module 240 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment of the present disclosure, the electronic device 200 may receive a user input from any external device (e.g., a computer or a server) connected thereto through the communication module 220.

The display module 260 (e.g., the display 150) may include a panel 262, a hologram 264, or a projector 266. The panel 262 may be, for example, liquid crystal display (LCD), active matrix organic light emitting diode (AMOLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment of the present disclosure, the display module 260 may further include a control circuit for controlling the panel 262, the hologram 264, and the projector 266.

The interface 270 may include, for example, an HDMI 272, a USB 274, an optical interface 276, or a D-subminiature (D-sub) 278. The interface 270 may be contained, for example, in the communication interface 160 shown in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment of the present disclosure, the camera module 291 may include at least one image sensor (e.g., a front image sensor or a rear image sensor), a lens (not shown), an image signal processor (ISP), (not shown), or a flash (e.g., light emitting diode (LED) or xenon lamp, not shown).

The power management module 295 may manage electric power of the electronic device 200. Although not shown, the power management module 295 may include, for example, a power management integrated circuit (PMIC), a charger IC, or a battery or fuel gauge.

The PMIC may be formed, for example, of an IC chip or SoC. Charging may be performed in a wired or wireless manner The charger IC may charge a battery 296 and prevent overvoltage or overcurrent from a charger. According to an embodiment of the present disclosure, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The haptic module 298 may convert an electric signal into a mechanical vibration. Although not shown, the electronic device 200 may include a specific processor (e.g., GPU) for supporting a mobile TV. This processor may process media data that comply with standards of digital multimedia broadcasting), digital video broadcasting (DVB), or media flow.

The haptic module 298 may produce various tactile effects a user can feel. A vibration effect is a representative example of tactile effects produced by the haptic module 298. If the haptic module 298 produces a vibration as a tactile effect, such a vibration may vary in intensity, pattern, etc. and may be outputted sequentially or in a composite form of different vibrations. In addition to a vibration effect, the haptic module 298 may produce various tactile effects such as an effect caused by the stimulus of a pin array vertically moved against a contact skin, an effect caused by the stimulus of a jet force or suction force of air through an air outlet or intake, an effect caused by the stimulus brushed against a skin, an effect caused by the stimulus through contact of an electrode, an effect caused by the stimulus using an electrostatic force, an effect caused by a sensation of cold or warm through an endothermic or exothermic device, or the like. The haptic module 298 may deliver tactile effects through a direct contact and also allow a user to feel tactile effects through a kinesthetic force of a finger or an arm. The haptic module 298 may include at least one vibration motor, at least one ultrasonic motor, at least one piezo actuator, or at least one linear resonant actuator (LRA).

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in the present disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

Figure 3A:
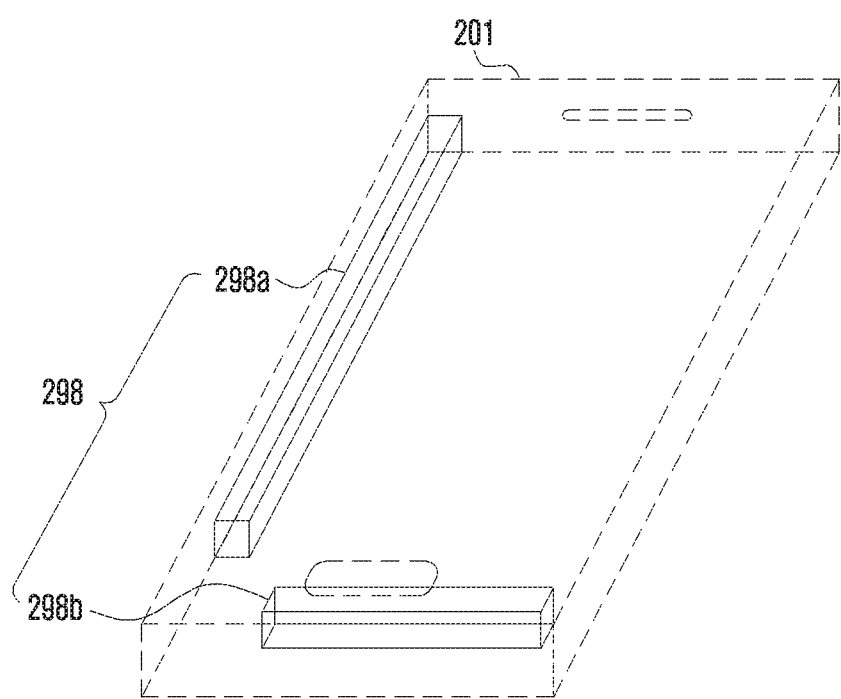
FIGS. 3A and 3B are diagrams illustrating a haptic module disposed inside an electronic device according to various embodiments of the present disclosure.
Figure 3B:
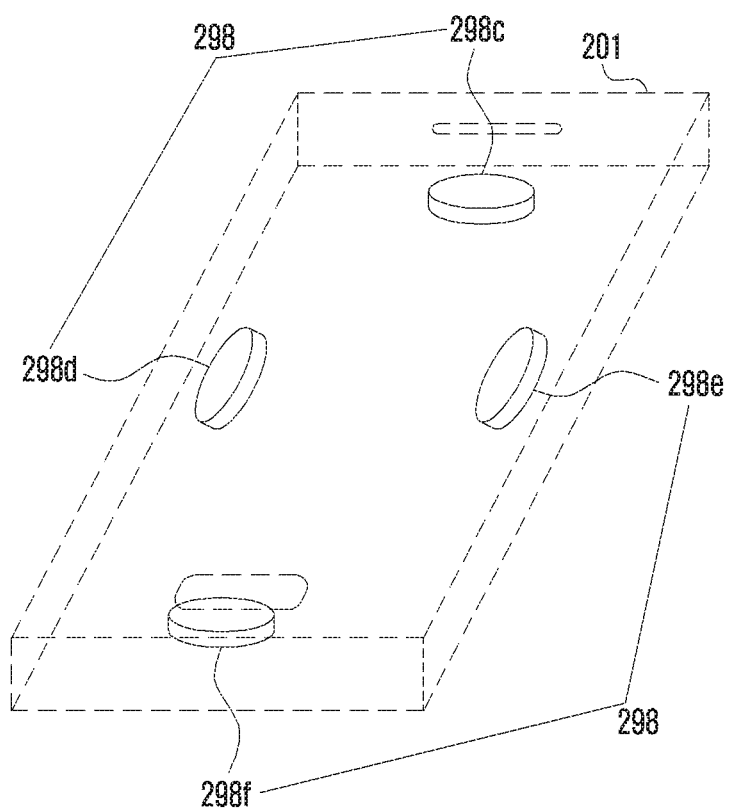

FIGS. 3A and 3B are diagrams illustrating a haptic module 298 disposed inside an electronic device 201 according to various embodiments of the present disclosure.

Referring to FIGS. 3A and 3B, when a predetermined event occurs, the haptic module 298 may provide a haptic feedback corresponding to the predetermined event. The haptic feedback is a technique to produce a vibration, a force, an impact, or a temperature sensation so as to allow a user to feel a tactile sensation. In case a predetermined event occurs, the electronic device 201 may detect a signal that requests a haptic feedback corresponding to the predetermined event. When the electronic device 201 detects such a signal, the haptic module 298 may provide various haptic feedbacks by applying different vibration conditions (e.g., a vibration frequency, a vibration length, vibration intensity, a vibration wave form, a vibration location, etc.) under the control of the processor 210. The haptic module 298 may provide a haptic feedback to a front surface (i.e., the face where the display module 260 is disposed) and a rear surface. Although the haptic module 298 may provide a haptic feedback to the entire of the electronic device 201. Alternatively, the haptic module 298 may provide haptic feedbacks with different strengths to respective parts (e.g., a touch point, edge parts) of the electronic device 201.

The electronic device 201 according to various embodiments of present disclosure may provide haptic feedbacks with different vibration strengths to respective parts thereof through the haptic module 298. In order to provide haptic feedbacks with different strengths to respective parts of the electronic device 201, the haptic module 298 may be configured in various shapes or disposed in various forms. For example, as shown in FIG. 3A, the haptic module 298 may include the first vibration motor 298a and the second vibration motor 298b each of which is configured in a bar shape. The first vibration motor 298a may be disposed on the lateral side of the electronic device 201, and the second vibration motor 298b may be disposed at the lower part of the electronic device 201. Using at least one of the first and second vibration motors 298a and 298b, the electronic device 201 may provide vibration effects with different strengths to respective parts thereof. For example, the first vibration motor 298a may regulate the frequency of vibration for each segment by producing a frequency of 50 Hz at the first trisected segment, producing a frequency of 70 Hz at the second trisected segment, and producing a frequency of 90 Hz at the third trisected segment. In another example, as shown in FIG. 3B, the haptic module 298 may include the third vibration motor 298c, the fourth vibration motor 298d, the fifth vibration motor 298e, and the sixth vibration motor 298f each of which is configured in a circular shape. The third vibration motor 298c may be disposed at the upper part of the electronic device 201, and the fourth vibration motor 298d may be disposed on the left lateral side of the electronic device 201. Also, the fifth vibration motor 298e may be disposed on the right lateral side of the electronic device 201, and the sixth vibration motor 298f may be disposed at the lower part of the electronic device 201. Using at least one of the third, fourth, fifth and sixth vibration motors 298c, 298d, 298e and 298f, the electronic device 201 may provide vibration effects with different strengths to respective parts thereof. The haptic module 298 according to various embodiments of the present disclosure is not limited to the above-mentioned shapes and dispositions and may be configured in various shapes and disposed in various forms.

Figure 4:
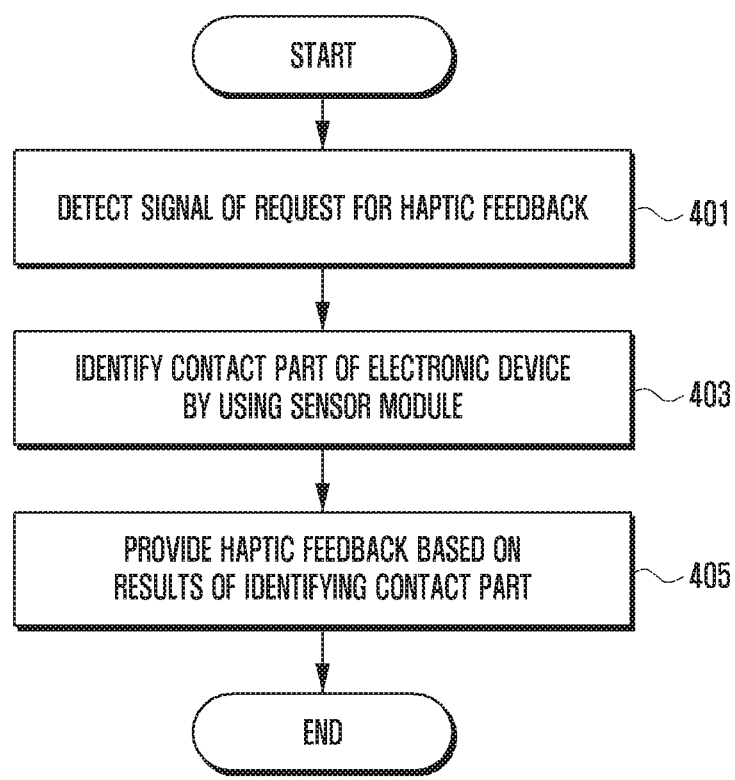
FIG. 4 is a flow diagram illustrating a method for providing a haptic feedback at an electronic device according to various embodiments of the present disclosure.

FIG. 4 is a flow diagram illustrating a method for providing a haptic feedback at an electronic device 201 according to various embodiments of the present disclosure.

Referring to FIG. 4, at operation 401, the electronic device 201 may detect a signal of a request for a haptic feedback. This signal of requesting the haptic feedback may be created during the execution of an application or during the playback of content. Also, in case a user enters a predetermined event to the electronic device 201, the above signal may be created in response to the predetermined event.

Figure 5A:
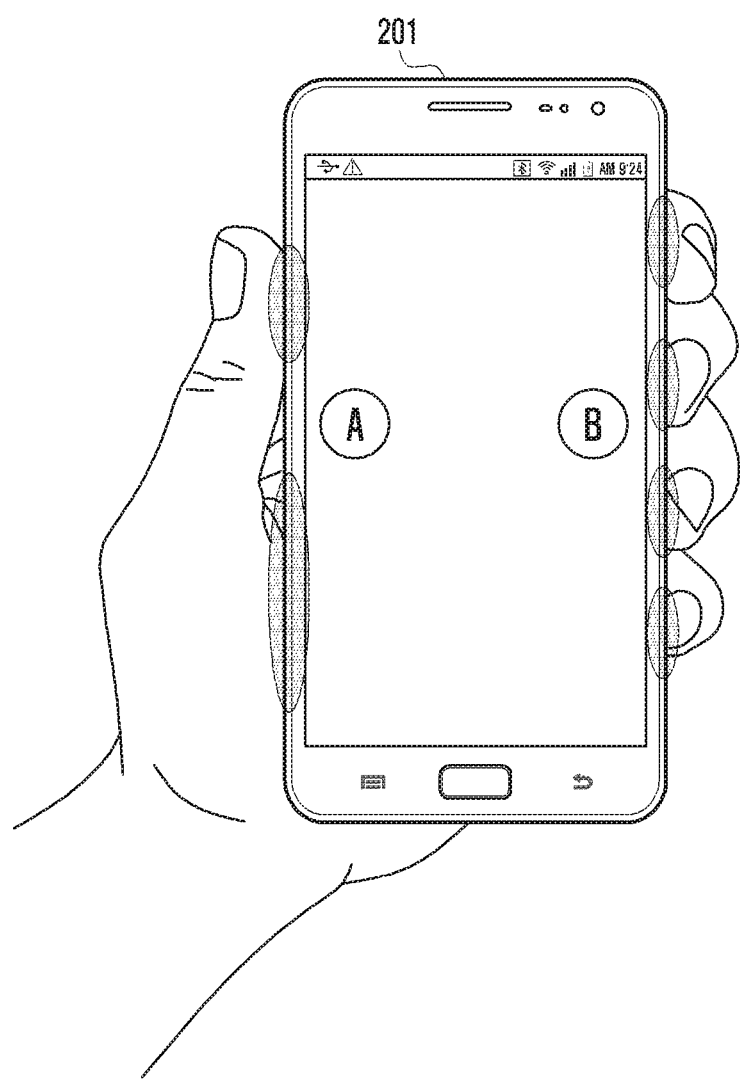
FIGS. 5A and 5B are diagrams illustrating an operation of providing a haptic feedback on the basis of a contact part of an electronic device according to various embodiments of the present disclosure.

At operation 403, the electronic device 201 may identify a contact part of the electronic device by using at least one of the sensor module 240 and the touch panel 252. The sensor module 240 may include the grip sensor 240f and the UV sensor 240m. The electronic device 201 may determine the location, shape, kind, etc. of user's hand by identifying the area, location, etc. of the contact part. For example, as shown in FIG. 5A, when a user grasps the electronic device 201 with his or her left hand, the sensor module 240 and the touch panel 252 may identify the area and location of contact with user's hand on the electronic device 201. By analyzing the contact area and contact location, the electronic device 201 may determine that a user grasps a specific part of the electronic device 201 with his or her left hand.

At operation 405, the electronic device 201 may provide a haptic feedback, based on results of identifying the contact part. The haptic feedback may include a vibration effect produced by at least one vibration motor.

Figure 5B:
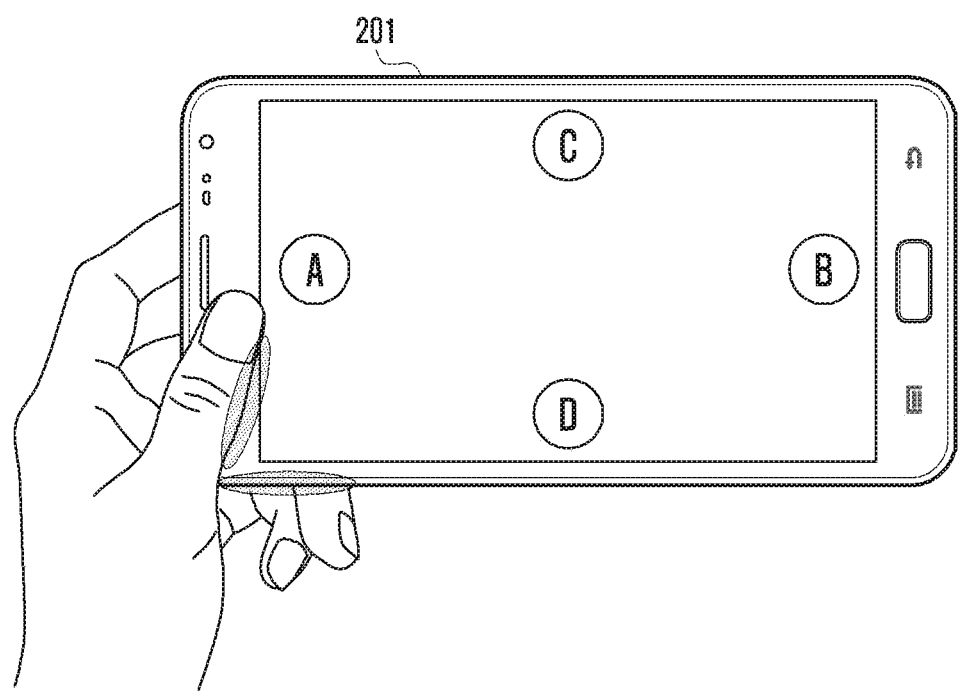

FIGS. 5A and 5B are diagrams illustrating an operation of providing a haptic feedback on the basis of a contact part of an electronic device according to various embodiments of the present disclosure.

Referring to FIGS. 5A and 5B, the electronic device 201 according to various embodiments of the present disclosure may provide a haptic feedback to a contact part of the electronic device 201 and to a certain part associated with the contact part. The electronic device 201 may be divided into parts in the unit of cell. When a specific cell part is contacted, the electronic device 201 may provide a haptic feedback to the specific cell part and a certain part associated with the specific cell part. For example, as shown in FIG. 5A, if the left lateral side of the electronic device 201 is a contact part and if the part A is associated with the contact part, the electronic device 201 may provide a haptic feedback to the contact part and the part A. In another example, as shown in FIG. 5A, if the right lateral side of the electronic device 201 is a contact part and if the part B is associated with the contact part, the electronic device 201 may provide a haptic feedback to the contact part and the part B. Such association between parts may be defined by a manufacturer at the time of manufacture or set by a user.

The electronic device 201 according to various embodiments of present disclosure may regulate the vibration strength of the haptic module 298 to be proportional to the area of a contact area. For example, as shown in FIG. 5A, when a user holds the electronic device 201 of a portrait orientation with the left hand near the part A of the electronic device 201, the area of a contact part is greater on the left lateral side of the electronic device 201 than on the right lateral side. Therefore, the electronic device 201 may produce a vibration effect of greater strength (e.g., vibration strength of 100 Hz) to the part A and produce a smaller vibration effect (e.g., vibration strength of 50 Hz) to the part B, gradually reducing the vibration strength from the part A to the part B. In another example, as shown in FIG. 5B, when a user holds the electronic device 201 of a landscape orientation with the left hand near the part A of the electronic device 201, the area of a contact part is greater on the left lateral side of the electronic device 201 than on the others. Therefore, the electronic device 201 may produce a vibration effect of greater strength (e.g., vibration strength of 100 Hz) to the part A and produce a smaller vibration effect (e.g., vibration strength of 50 Hz) to the part B, gradually reducing the vibration strength from the part A to the part B. In this case, the electronic device 201 may produce, to the part C and/or the part D, a vibration effect (e.g., vibration strength of 75 Hz) of being smaller than that of the part A and being greater than that of the part B.

The electronic device 201 according to various embodiments of the present disclosure may provide a haptic feedback, based on a tilt state thereof. The electronic device 201 may identify a tilt state thereof by using the gyro sensor 240b and/or the acceleration sensor 240e. Then, depending on such a tilt state, the electronic device 201 may produce vibration effects of different strengths to respective parts of the electronic device 201. For example, as shown in FIG. 5B, let's suppose that the tilt of the electronic device 201 is 0 degree when the display module 260 of the electronic device 201 is parallel with a horizontal plane and that the tilt of the electronic device 201 is 90 degrees when the display module 260 is vertical to a horizontal plane. In this case, according as the tilt of the electronic device 201 becomes greater (e.g., an angle of the electronic device with regard to a horizontal plane is increased from 0 degree to 90 degrees), the electronic device 201 may gradually increase the vibration strength of the part C and gradually decrease the vibration strength of the part D. Similarly, according as the tilt of the electronic device 201 becomes smaller (e.g., an angle of the electronic device with regard to a horizontal plane is decreased from 90 degrees to 0 degree), the electronic device 201 may gradually decrease the vibration strength of the part C and gradually increase the vibration strength of the part D. The present disclosure is not limited to the above-discussed example, and the strengths of vibration effects for respective parts of the electronic device 201 may be regulated depending on a tilt.

Figure 6A:
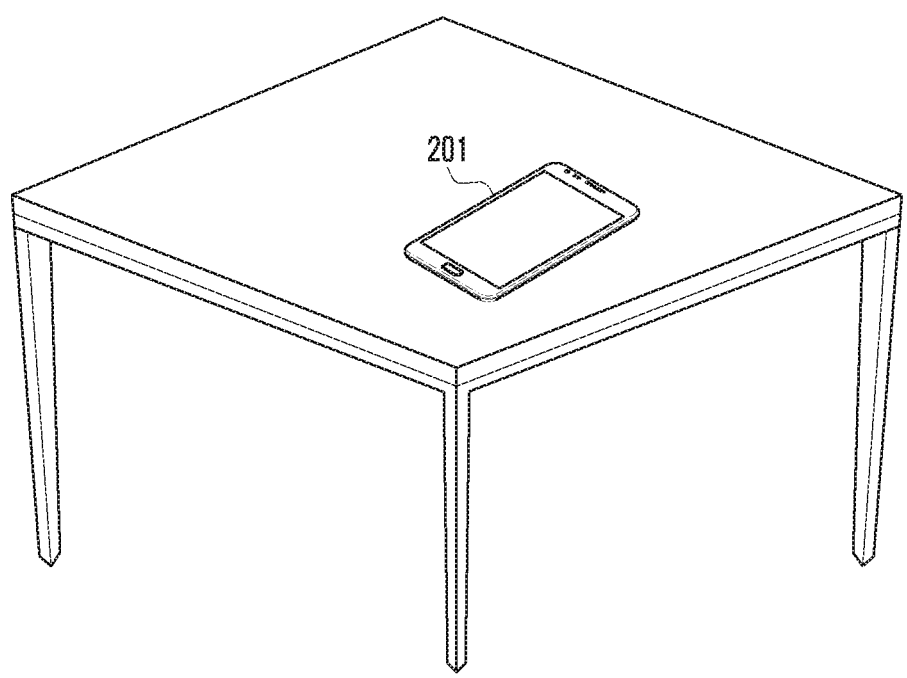
FIGS. 6A and 6B are diagrams illustrating an operation of providing various haptic feedbacks on the basis of a postural state of an electronic device according to various embodiments of the present disclosure.
Figure 6B:
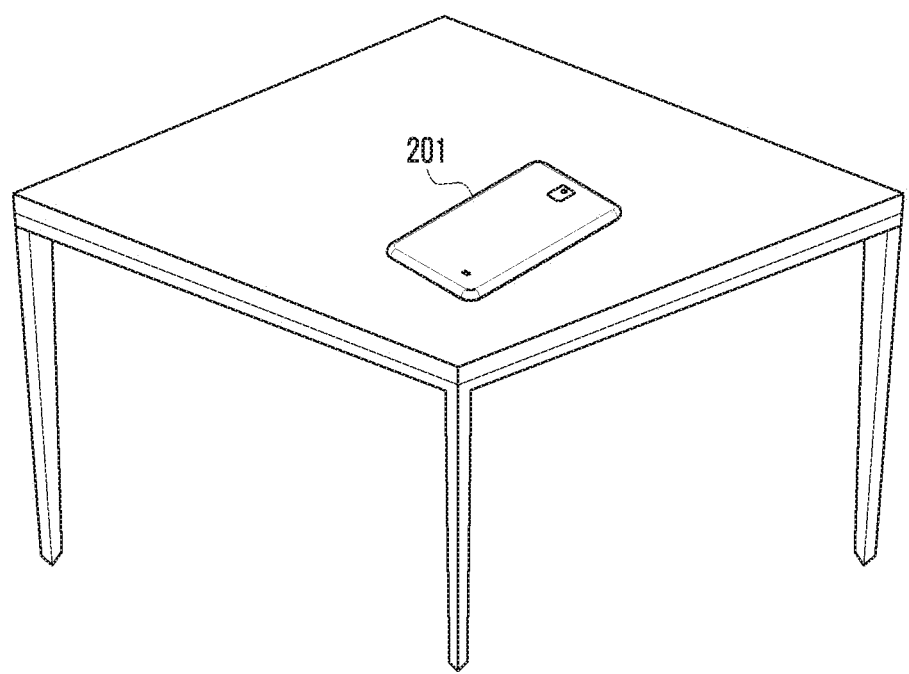

FIGS. 6A and 6B are diagrams illustrating an operation of providing various haptic feedbacks on the basis of a postural state of an electronic device according to various embodiments of the present disclosure.

Referring to FIGS. 6A and 6B, the electronic device 201 according to various embodiments of the present disclosure may provide a haptic feedback, based on a postural state thereof. The electronic device 201 may identify a postural state thereof by using the sensor module 240. For example, using at least one of the gyro sensor 240b, the acceleration sensor 240e and the illuminance sensor 240k, the electronic device 201 may identify a postural state thereof The postural state of the electronic device 201 may include the first postural state in which the rear surface of the electronic device 201 faces the direction of gravity, namely, the display module 260 of the electronic device 201 faces the sky as shown in FIG. 6A, and the second postural state in which the front surface of the electronic device 201 faces the direction of gravity, namely, the display module 260 of the electronic device 201 faces the ground as shown in FIG. 6B. When the electronic device 201 is in the first postural state as shown in FIG. 6A, the electronic device 201 may provide a haptic feedback having a smaller strength than that of a reference haptic feedback. This reference haptic feedback may refer to a vibration effect which is set as default in the electronic device 201. In case of the first postural state, the electronic device 201 may gradually increase the strength of a haptic feedback by a predetermined value at given time intervals so that a user can recognize the haptic feedback. When the electronic device 201 is in the second postural state as shown in FIG. 6B, the electronic device 201 may provide a haptic feedback having a smaller strength than that of a reference haptic feedback. In case of the second postural state, such a smaller haptic feedback is provided so as to minimize any inconvenience incurred to persons located near the electronic device 201.

The electronic device 201 according to various embodiments of the present disclosure may provide a haptic feedback, based on external environment information thereof by using the sensor module 240. The electronic device 201 may check a lock state or a moving state by using the sensor module 240 or the communication module 220. If the electronic device 201 varies in position in a lock state, the electronic device 201 may provide a haptic feedback having the maximum strength through the haptic module 298 so that a user can recognize the haptic feedback.

The electronic device 201 according to various embodiments of the present disclosure may provide a haptic feedback, based on content being played. This content may include audio content or media content. In case audio content is being played, the electronic device 201 may analyze the audio content and thereby identify the volume of sound in the content. Then the electronic device 201 may provide a haptic feedback to be proportional to the volume of sound. For example, the electronic device 201 may gradually increase a haptic feedback when the sound of audio content is gradually increased, and also may gradually decrease a haptic feedback when the sound is gradually decreased. In case media content is being played, the electronic device 201 may analyze the media content and thereby identify a central object in the content. Then, if a surrounding color of the central object is changed or if the size of the central object is changed, the electronic device 201 may provide a haptic feedback based on a color change rate or size change rate. For example, if the color change rate of the central object is greater than a predetermined reference rate, the electronic device 201 may provide a haptic feedback having a greater strength than that of a reference haptic feedback. If the color change rate is smaller than the reference rate, the electronic device 201 may provide a haptic feedback having a smaller strength than that of the reference haptic feedback. Additionally, when the size of the central object is gradually increased, the electronic device 201 may increase the strength of a haptic feedback. Similarly, when the size of the central object is gradually decreased, the electronic device 201 may decrease the strength of a haptic feedback.

Figure 7:
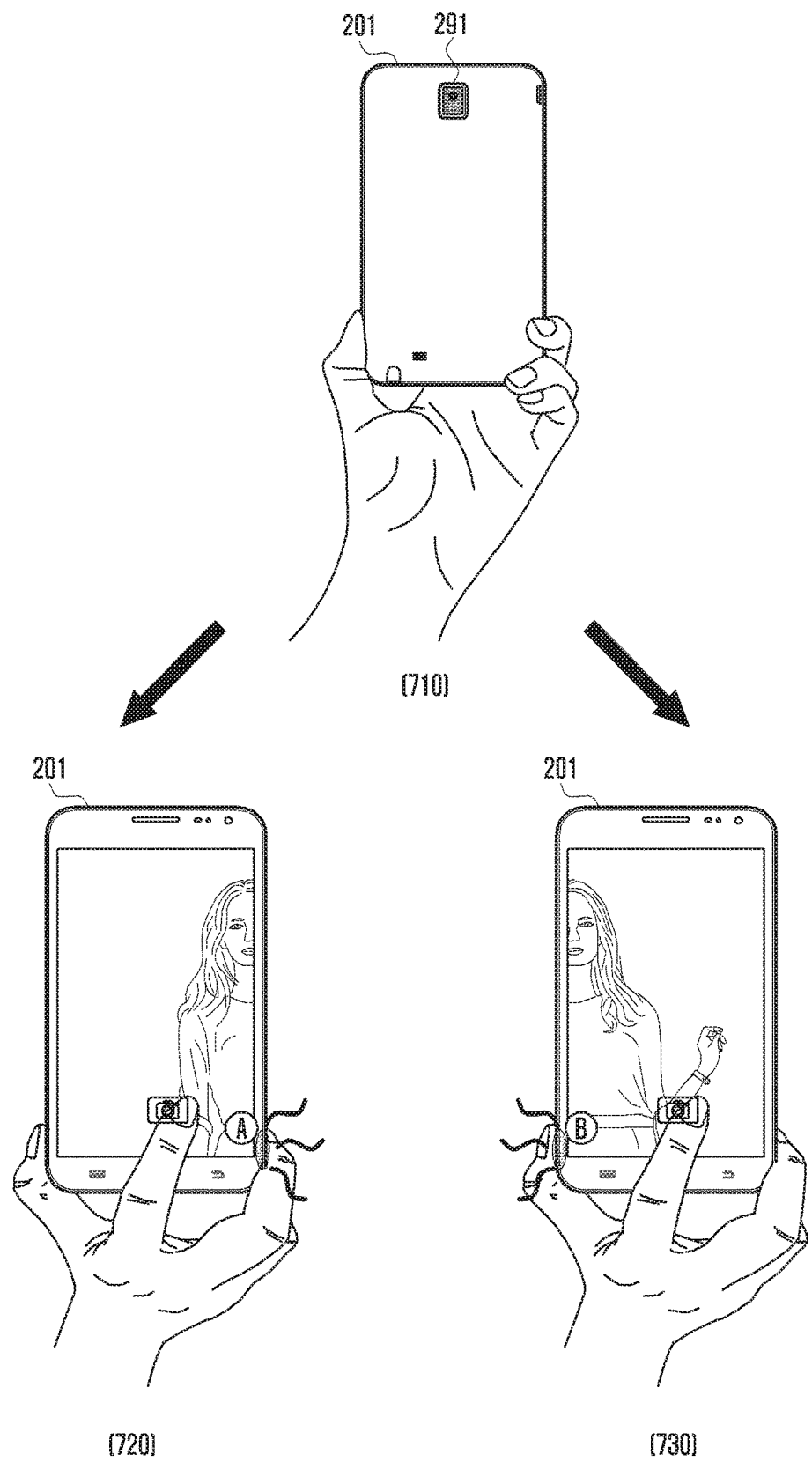
FIG. 7 is a diagram illustrating an operation of providing a haptic feedback on the basis of a positional state of a user with regard to a camera module according to various embodiments of the present disclosure.

FIG. 7 is a diagram illustrating an operation of providing a haptic feedback on the basis of a positional state of a user with regard to a camera module according to various embodiments of the present disclosure.

Referring to FIG. 7, the electronic device 201 according to various embodiments of the present disclosure may provide a haptic feedback, based on a positional state of a user with regard to a camera module when a camera function is performed. In case a user performs a selfie photography using a rear camera, the electronic device 201 may provide a guide to a user through a haptic feedback. For example, as shown in FIG. 7 (710), a user may perform a selfie photography function by using the rear image sensor of the camera module 291 of the electronic device 201. In this case, a user fails to see the display module 260 of the electronic device 201 and thus may have a difficulty in taking a desired picture or a desired video. The electronic device 201 may analyze a user image captured by the camera module 291 and thereby identify a user position. Also, the electronic device 201 may provide a haptic feedback so that a user's face image is located in a defined point. For example, as shown in FIG. 7 (720), if a user is located at a right position with regard to the camera module 291, the electronic device 201 may provide a haptic feedback to the part A thereof (i.e., the left lateral side of the electronic device 201) so that a user image will be located centrally. In another example, as shown in FIG. 7 (730), if a user is located at a left position with regard to the camera module 291, the electronic device 201 may provide a haptic feedback to the part B thereof (i.e., the right lateral side of the electronic device 201) so that a user image will be located centrally.

FIG. 8 is a diagram illustrating an operation of providing a haptic feedback on the basis of position information of an electronic device so as to perform a navigation function according to various embodiments of the present disclosure.

The electronic device 201 according to various embodiments of the present disclosure may provide a haptic feedback, based on position information thereof when a navigation function is performed. In case a user selects a desired destination and moves toward the destination, the electronic device 201 may perform a navigation function. The electronic device 201 may identify a current position thereof, set a route toward the destination, and then provide a guide to the destination through a haptic feedback. The electronic device 201 may provide a haptic feedback to a user by adjusting the strength of the haptic feedback or time intervals for providing the haptic feedback, depending on a remaining distance to a specific notification. For example, as shown in FIG. 8 (810), if there is a need to left turn on 20 meters ahead during navigation, the electronic device 201 may provide a haptic feedback to the part A (i.e., the left lateral side of the electronic device 201) (820). In this case, the electronic device 201 may provide a haptic feedback of 50 Hz to the part A at intervals of two seconds. Then, if a user arrives at a position for a left turn, the electronic device 201 may provide a haptic feedback to the part A (i.e., the left lateral side of the electronic device 201) (830). In this case, the electronic device 201 may provide a haptic feedback of 100 Hz to the part A at intervals of one second.

As discussed hereinbefore, the electronic device and methods provide various haptic feedbacks.

The above-discussed method is described herein with reference to flowchart illustrations of user interfaces, methods, and computer program products according to various embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a non-transitory computer usable or non-transitory computer-readable memory that can direct a computer or other programmable data processing apparatus to function in a particular manner, such that the instructions stored in the non-transitory computer usable or non-transitory computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While the present disclosure has been shown and described with reference to various embodiments thereof, it will be understood by those skilled in the art that various changes in form and details may be made therein without departing from the spirit and scope of the present disclosure as defined by the appended claims and their equivalent.

What is claimed is:

1. An electronic device comprising:
a display configured to display a media content including an object;
a haptic module configured to provide a haptic feedback;
a processor electrically connected to the haptic module; and
a memory electrically connected to the processor,
wherein the memory stores instructions, that when executed by the processor, cause the processor to control to:
detect a signal of a request for the haptic feedback,
identify a contact part of the electronic device by using a sensor module,
provide the haptic feedback on the contact part
identify a size of the object by analyzing the media content,
identify an amount of change of the size of the object, and
adjust a strength of the haptic feedback based on the amount of change of the size of the object.

2. The electronic device of claim 1, wherein the haptic feedback is produced by at least one vibration motor contained in the haptic module.

3. The electronic device of claim 1,
wherein the instructions, when executed by the processor, cause the processor to control to identify the contact part by using a touch panel, and
wherein the sensor module includes at least one of a grip sensor or a pressure sensor.

4. The electronic device of claim 1, wherein the instructions, when executed by the processor, cause the processor to control to identify at least one of an area of the contact part and a location of the contact part.

5. The electronic device of claim 1, wherein the instructions, when executed by the processor, cause the processor to control to provide the haptic feedback based on a postural state of the electronic device.

6. The electronic device of claim 1, wherein the instructions, when executed by the processor, cause the processor to control to provide the haptic feedback based on a tilt state of the electronic device.

7. The electronic device of claim 1, wherein the instructions, when executed by the processor, cause the processor to control to provide the haptic feedback based on content being played in the electronic device.

8. The electronic device of claim 1, wherein the instructions, when executed by the processor, cause the processor to control to provide the haptic feedback based on a positional state of a user with regard to a camera module when a camera function is performed.

9. The electronic device of claim 1, wherein the instructions, when executed by the processor, cause the processor to control to provide the haptic feedback based on position information of the electronic device when a navigation function is performed.

10. A method for providing a haptic feedback of an electronic device, the method comprising:
detecting a signal of a request for the haptic feedback;
identifying a contact part of the electronic device;
determining a strength of the haptic feedback;
providing the haptic feedback on the contact part based on the determined strength of the haptic feedback,
identifying a size of an object included in a media content being played in the electronic device by analyzing the media content;

identifying a change of the size of the object; and
adjusting a strength of the haptic feedback based on the change of the size of the object.

11. The method of claim 10, wherein the haptic feedback is produced by at least one vibration motor contained in a haptic module.

12. The method of claim 10, wherein the identifying of the contact part includes identifying the contact part by using a touch panel, and a sensor module includes at least one of a grip sensor and/or a pressure sensor.

13. The method of claim 10, wherein the identifying of the contact part includes identifying a location of the contact part.

14. The method of claim 10, wherein the providing of the haptic feedback includes providing the haptic feedback to the contact part and a part associated with the contact part.

15. The method of claim 10, wherein the providing of the haptic feedback includes providing the haptic feedback based on a postural state of the electronic device.

16. The method of claim 10, wherein the providing of the haptic feedback includes providing the haptic feedback based on a tilt state of the electronic device.

17. The method of claim 10, wherein the providing of the haptic feedback includes providing the haptic feedback based on a positional state of a user with regard to a camera module when a camera function is performed.

18. The method of claim 10, wherein the providing of the haptic feedback includes providing the haptic feedback based on position information of the electronic device when a navigation function is performed.

* * * * *